June 7, 1966 — T. S. SPRAGUE ETAL — 3,255,088
INTEGRAL NUCLEAR REACTOR-STEAM GENERATOR UNIT
Original Filed Aug. 22, 1960 — 4 Sheets-Sheet 1

INVENTORS
Theodore S. Sprague
Johannes H. Ammon
BY
ATTORNEY

June 7, 1966    T. S. SPRAGUE ETAL    3,255,088
INTEGRAL NUCLEAR REACTOR-STEAM GENERATOR UNIT
Original Filed Aug. 22, 1960    4 Sheets-Sheet 2

INVENTORS
Theodore S. Sprague
Johannes H. Ammon
BY
ATTORNEY

*INVENTORS*
**Theodore S. Sprague
Johannes H. Ammon**

BY

*ATTORNEY*

United States Patent Office 3,255,088
Patented June 7, 1966

---

3,255,088
INTEGRAL NUCLEAR REACTOR-STEAM GENERATOR UNIT
Theodore S. Sprague, Hudson, and Johannes H. Ammon, Akron, Ohio, assignors to The Babcock & Wilcox Company, New York, N.Y., a corporation of New Jersey
Continuation of application Ser. No. 51,044, Aug. 22, 1960. This application Sept. 20, 1963, Ser. No. 311,611
13 Claims. (Cl. 176—53)

This application is a continuation of our application Serial No. 51,044, filed on August 22, 1960, now abandoned.

This invention relates in general to a nuclear reactor and more particularly it provides a compact nuclear steam generator in which the reactor and heat exchangers are combined as an integral unit having a common support.

With the exception of the direct boiling reactor, all power reactors have utilized the so-called indirect cycle, wherein the heat of the reactor is absorbed by a first heat transfer medium which in turn transfers it to a vaporizable fluid by indirect heat transfer which may be used, for example, to drive a prime mover. Thus, the vaporizable fluid is only indirectly connected to the heat emitting source. Such systems have been considered to be quite desirable by those skilled in the art for the reason that they assure that the vapor used for producing power is not subject to radioactivity and, under most all circumstances, is not subject to such radioactivity even in the event of a rupture of the fuel elements.

Heretofore, indirect vapor generators have been constructed with the fissionable material contained within a reactor vessel and the vapor generator contained in a separate heat exchanger vessel, which vessels are connected by lines to provide a continuous circulation of the heat transfer medium therethrough which may be maintained by a pump. Further, due to the maintenance and emergency requirements of the reactor, several heat exchange units have been arranged in separate parallel circuits so that there is a plurality of such units serving one reactor, with each of these circuits containing valves permitting maintenance or emergency measures on individual units.

From a reliability viewpoint, it has been recognized that it would be desirable to eliminate the forced circulation pumps of the systems of the prior art arrangements for the reason that these pumps are subject to occasional failure. No matter how infrequent such failures may be, they require the shutdown of the unit and the maintenance of the pump, both of which are expensive. Further, it is advantageous to eliminate the separate heat exchangers by placing the heat exchange elements within the reactor pressure vessel. Attempts to meet these desirable requirements have uniformly resulted in poor arrangements from an engineering viewpoint. Some of the problems which confront those skilled in the art are the necessity that the fissionable material be arranged such that any part or all of it may be readily removed at frequent intervals, and that the heat exchange units be capable of being repaired quickly without shutting down the reactor more than a very limited period of time, preferably less than one day. Additionally, it is necessary for the unit to have excellent natural circulation of the primary coolant fluid with the unit so arranged that the total reactor and vapor generator occupies a minimum volume and preferably be supported as a single unit. This latter is particularly true for mobile reactors that may be used in ships, trains, or other portable power plants.

The present invention thus provides a reactor arrangement providing complete accessibility to the fuel, maximum natural circulation ability, ready accessibility and repair of the heat exchange units, unitary support of the reactor and steam generator, and maximum compactness.

Accordingly, the reactor arrangement provides an upright wall forming a vertically elongated cylindrical pressure vessel having an opening in the upper end thereof with a removable closure for the opening. An upright substantially cylindrical baffle is supported in and arranged to be removed through the end opening and coacts with the pressure vessel to form an annular downcomer passage therebetween and an upright central riser chamber with the riser chamber and the downcomer passage being in communication with each other at the upper and lower ends thereof. Means including a plurality of heterogeneous fuel elements are arranged as a core in the lower portion of the riser chamber to provide a controlled self-sustaining fission-type chain reaction. The pressure vessel contains a liquid coolant having a natural circulation upwardly through the core and the riser chamber and downwardly through the downcomer passage. A plurality of heat exchange tube bundles are disposed in the downcomer passage with each bundle having an individual secondary fluid connection.

Furthermore, the present invention provides that each tube bundle may be individually removed from the pressure vessel through the pressure vessel opening by an initial radial movement of the tube bundle after removal of the baffle.

The secondary fluid connection of each tube bundle is arranged to removably extend through the pressure vessel wall facilitating the removal of each tube bundle from the pressure vessel.

Additionally, the invention provides a vapor-liquid drum attached to and supported by the pressure vessel at a position above the heat exchange tube bundles with the drums connected to the tube bundles to provide for the circulation of the secondary fluid in a closed circuit between the tube bundles and the drum.

Moreover, the invention calls for each of the secondary fluid connections to comprise a chamber having a tube sheet adapted to register with an opening in the pressure vessel wall to provide a removable pressure retaining closure for the openings.

As a further element of the invention, a cup-shaped closure is adapted to register with the opening in the upper end of the pressure vessel with control rod nozzles passing through the bottom portion of the closure to thus provide a compact arrangement of minimum height.

The various features of novelty which characterize the invention are pointed out with particularity in the claims annexed to and forming a part of this specification. However, for a better understanding of the invention, its operating advantages and specific objects attained by its use, reference should be had to the accompanying drawing and descriptive matter in which there is illustrated and described preferred embodiments of the invention.

Figure 1:
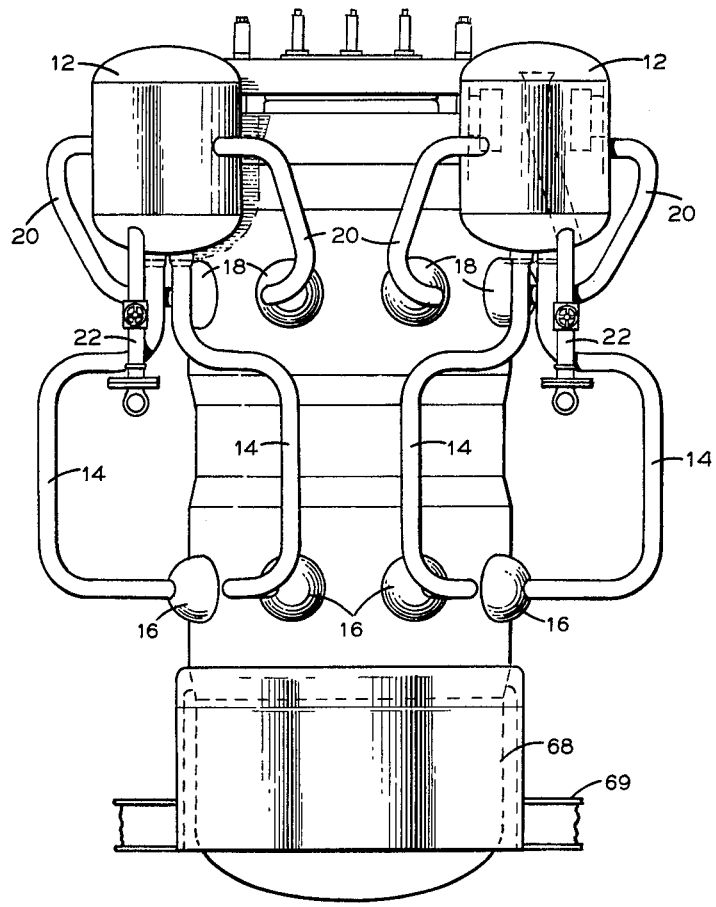
FIG. 1 is a side elevation of the reactor arrangement.
Figure 2:
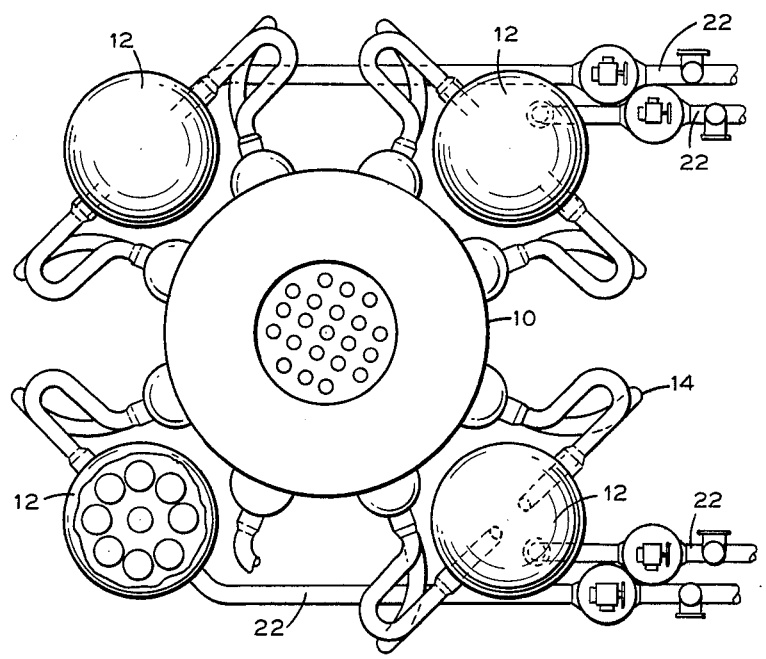
FIG. 2 is a top view of FIG. 1 with a portion of one vapor-liquid drum broken away to reveal its interior arrangement.

With special reference to FIGS. 1 and 2, a vertically elongated cylindrical reactor pressure vessel 10 having an upright wall is shown having four vertically arranged vapor-liquid separating drums 12 disposed at 90 degree intervals around the upper periphery of the vessel. These drums are attached to and supported by the pressure vessel 10. The vapor-liquid separating drums may be any of the well known type and preferably of the type having a ring of whirl chambers, as shown in Patent No. 2,923,377. Each of the drums 12 is arranged to provide separating capacity for two parallelly arranged vapor generating tube bundles. Thus, as shown in the figures, each drum has two downcomers 14 connected at their lower end to inlet headers 16 and at their upper end to the bottom of the separator. Outlet chambers 18, at the upper part of the vessel 10, are attached to the upper part of the vapor drum by risers 20. Each drum is constructed with a steam outlet 22 to remove vapor from the upper interior portion of the separator and pass it down through the separator and out the bottom of the separator vessel so that an arrangement is provided with four valve controlled steam outlets in parallel. These then pass to a point of use (not shown).

Figure 5:
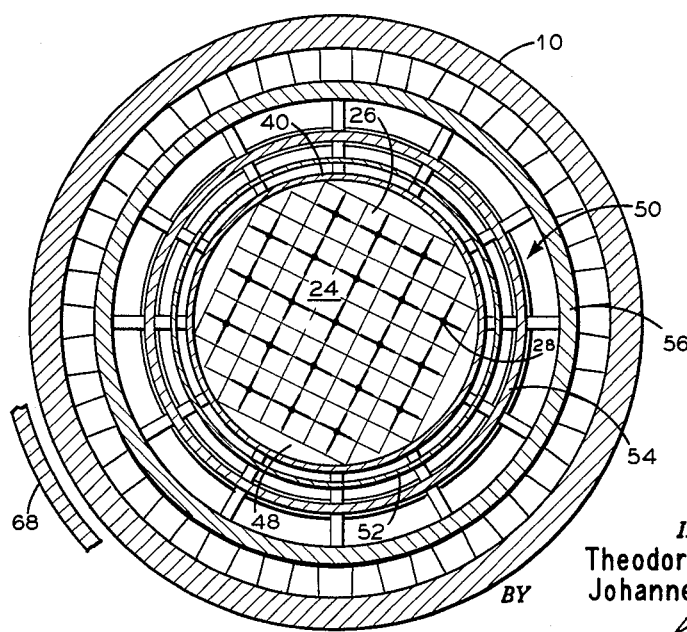
FIG. 5 is another section taken along the line 5—5 of FIG. 3.
Figure 3:
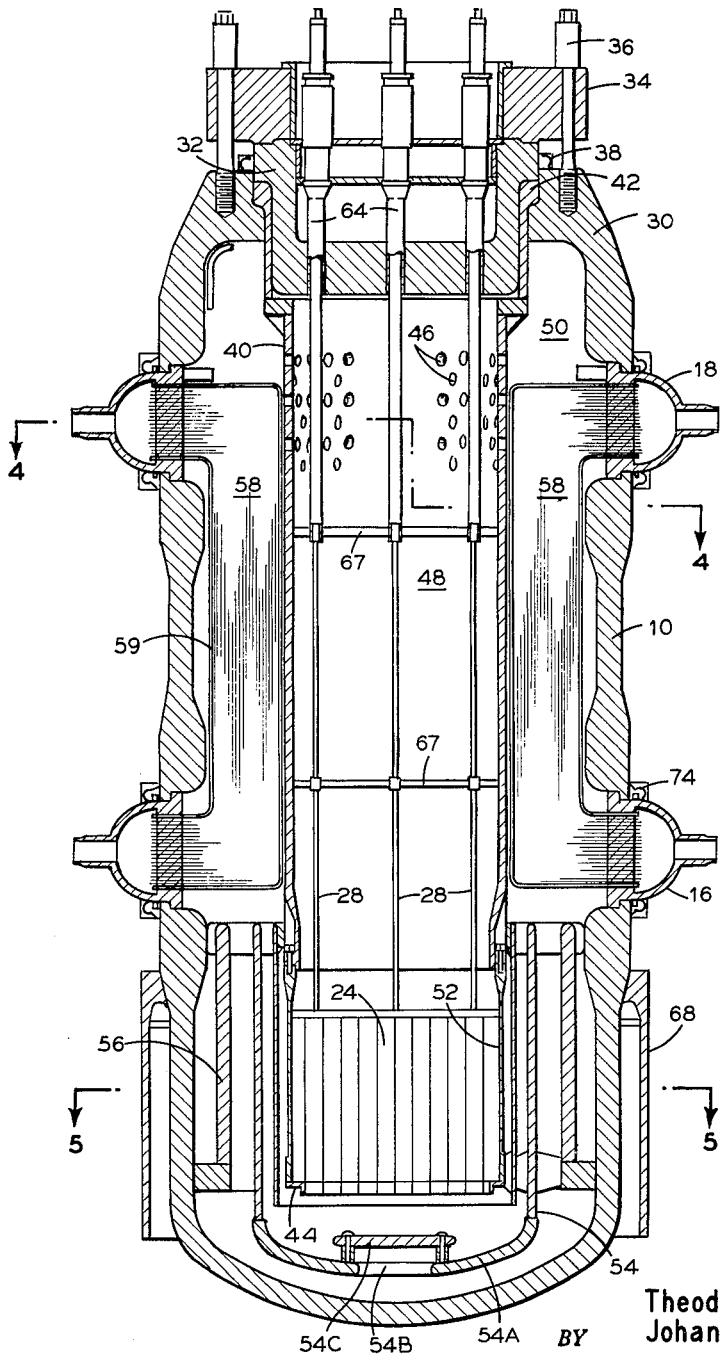
FIG. 3 is a vertical section through the reactor vessel.
Figure 4:
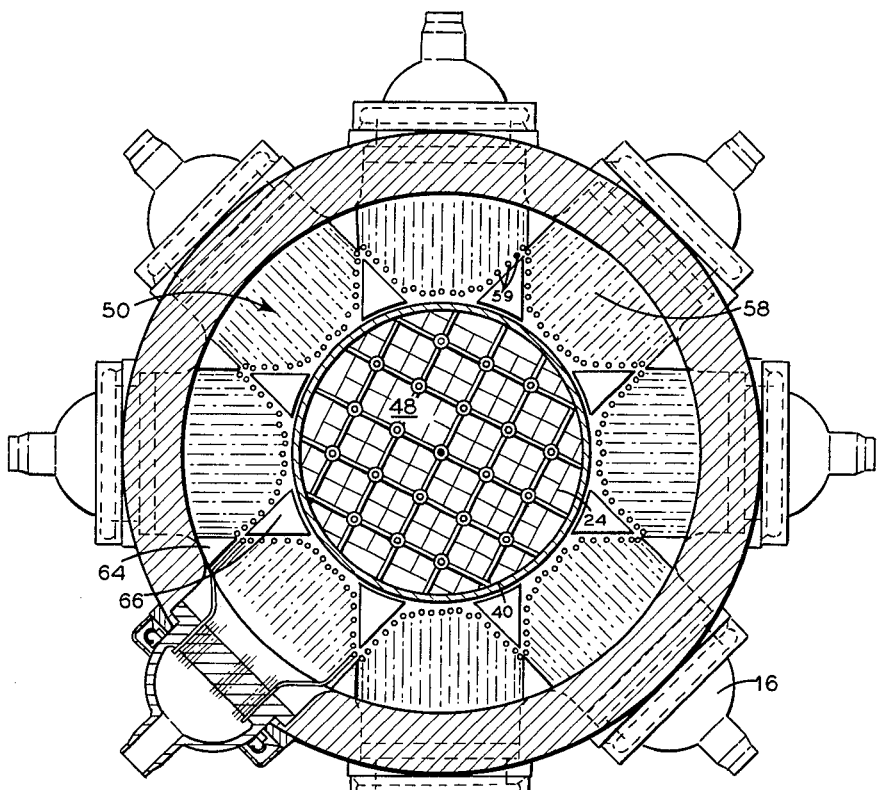
FIG. 4 is a section taken generally along the line 4—4 of FIG. 3 and illustrating a typical section through an outlet chamber.

With reference to FIGS. 3, 4 and 5, the reactor vessel is vertically elongated and of substantially cylindrical cross-section. This specific embodiment of the reactor has been especially arranged for use in a pressurized water cooling system which acts at high pressure, thus accounting for the heavy cross-section of the walls of the vessel 10. Centrally arranged in the lowermost portion of the vessel there is a reactor core 24 comprised of a multiplicity of fuel elements 26 and control rods 28 which may be arranged in a typical fashion in which the fuel elements surround individual control rods. For a typical arrangement of such a core, see applicants' assignee's copending application Serial No. 798,031, filed March 9, 1959, now Patent No. 3,194,743 granted July 13, 1965.

At the upper end of the reactor vessel 10 there is a circular opening formed by the flange 30 having a diameter which is somewhat greater than the diameter of the core 24. Sitting within the flange 30 and arranged to mate therewith is a cup-shaped closure 32 which is held in place by an upper flange 34 through the compression of a ring of bolts 36. The cup-shaped closure is sealed to the pressure vessel flange 30 through a flexible membrane seal 38 having a general construction similar to that described in applicants' assignee's copending application 712,175, filed Jan. 30, 1958, now Patent No. 3,055,538 granted September 25, 1962. Thus, the closure 32 is removable permitting the core and control rods to be removed in toto.

The interior of the pressure vessel 10 is divided by a plate means 40 forming a tubular baffle having a generally cylindrical cross section with a maximum diameter less than the diameter of the pressure vessel opening. The baffle is dependently supported at its upper end by an overlapping flange 42 resting on the flange 30 of the pressure vessel opening. The plate means 40 extends to substantially the bottom of the reactor vessel 10 where it projects just beyond the bottom of the core 24 and extends across the bottom thereof to provide a core retaining grid 44 adapted to hold the individual fuel elements 26 and guide tubes for the control rods 28. The grid 44 is a known type and contains a multiplicity of openings which, when fitted with fuel elements, allows the flow of the primary coolant upward through the core from the space directly below the end of the grid 44. At the upper end of the plate means there is a multiplicity of fluid outlet holes 46. Thus, the plate means 40 divides the interior of the reactor into a centrally arranged upright riser chamber 48 of generally uniform circular cross-section and in conjunction with the walls of the reactor vessel 10 also forms an annular downcomer 50 with the riser and downcomer being open to each other at their ends.

A plurality of spaced thermal shields 52, 54 and 56 are concentrically arranged in the downcomer 50 around the core 24. Each of these shields are arranged with spacers so as to bear upon each other at spaced peripheral positions to maintain their concentricity. These shields extend throughout a height which is somewhat greater than the height of the fuel elements to thus provide a plurality of vertically extending annular flow spaces between the shields. Thermal shield 54 has a cup shaped shield portion 54A attached to its lower end with an opening 54B in its lowermost portion and an extension piece 54C thereabove to provide a shielded inlet to the core 24 at the lower end of the pressure vessel 10. This arrangement therefore provides, as is well known in the art, a thermal shield construction with alternate layers of liquid and steel for slowing up the heavy fragments and particles naturally emanating from the core and converting them to thermal energy prior to their reaching the pressure vessel wall. The core 24 is thus supported in the lower portion of the pressure vessel 10 by the baffle plate means 40 and thermal shield 52 which is removably connected to the lower end of the baffle 40 at the top of the core.

Figure 6:
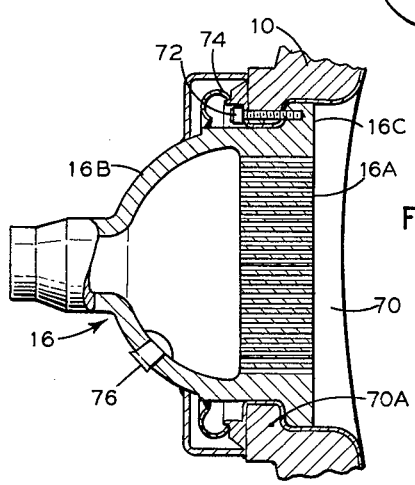
FIG. 6 is an enlarged side section of a typical chamber showing the tube sheet closure.

In the upper portion of the annulus 50, above the top of the core 24, a plurality of bundles 58 of heat exchange tubes 59 is provided. In this particular embodiment (see FIG. 4) there are eight identical tube bundles which are arranged to substantially fill the radial extent of the annular downcomer 50. Each bundle is comprised of a multiplicity of generally C-shaped tubes 59 which are connected at their ends to inlet and outlet chambers 16 and 18, respectively. The inlet and outlet chambers are each identical in construction and will be described more specifically with reference to FIG. 6. Each tube bundle 58 has the vertical length of the tube of substantially constant cross-section with each tube having a reduced diameter section in the bends and at the ends which extend into the inlet and outlet chambers. A number of vertically extending flow baffles 64 and 66 having a triangular cross-section are disposed between adjacent tube bundles. The function of these baffles is to fill the flow spaces and force the flowing coolant to pass through the heat exchange tube bundle. The inlet and outlet chambers 16, 18 are connected to the steam drum 12 as illustrated with respect to FIGS. 1 and 2.

The control rods 28 are operated through drive mechanisms housed in the control rod nozzles 65 which are integrally attached to openings in the bottom portion of the cup shaped closure 32. The control rods 28 are guided by guides 67 in the riser chamber and may be moved vertically into or out of the core as desired in a well known manner. As a result of the use of the cup shaped closure the control drive mechanisms of the present invention are below the topmost portion of the pressure vessel, resulting in a lower overall height than would otherwise be possible.

At the lower portion of the pressure vessel 10 there is an external annularly arranged support skirt 68 which is integrally attached to the vessel support 69 (FIG. 1), to thus support the entire nuclear steam generator.

The plurality of individual tube bundles 58 have their individual inlet and outlet chambers 16 and 18, removably connected through the pressure vessel wall. Each tube bundle 58 has a maximum radial dimension less than the diameter of the pressure vessel upper end opening formed by flange 30 so that the tube bundles may be individually and readily removed from the reactor vessel when the cup shaped closure 32 and the dependent baffle forming plate means 40 have been removed from the vessel. This is accomplished by providing openings through the vessel wall at uniformly spaced positions around the circumference through which the inlet and outlet means, 16 and 18, extend. Thus, with particular reference to FIG. 6 for a typical construction, the vessel wall has an opening 70 extending therethrough and having an outer lip 70A of a smaller diameter providing a flange. The chamber (for the sake of convenience will be designated 16) includes a tube sheet 16A which is integrally attached to a hemispherical head 16B enclosing one face thereof to form a fluid chamber. The tube sheet normally has a multiplicity of tube holes therein through which the ends of the tubes are attached in a well known, tight manner. The inner face of the tube sheet 16A has a lip portion 16C of a greater diameter than the outer face, which lip portion is adapted to register with and be retained by the flange 70A so that the internal pressure of the pressure vessel 10 tends to force the tube sheet outwardly against the retaining flange 70A. The flange 70A and lip portion 16C of the tube sheet are mechanically held together by a multiplicity of bolts 72 that are closely spaced in a ring around the chamber. These bolts are enclosed within a semitoroidal flexible membrane 74 whose ends are integrally attached across the joint of the flange 70A and the chamber 15 to provide a flexible fluid tight seal. This seal may be removed by cutting either the weld connection between the membrane 74 and the flange 70A or the inlet chamber 16. This construction permits both the inlet and outlet chambers and the tube bundles to be individually removed from the interior of the vessel through the pressure vessel end opening by an initial radial inward movement after removal of the baffle plate 40. Each chamber is provided with a welded handhole cover 76 which may be removed should it be desired to gain access to the ends of the individual tubes for plugging, welding or other maintenance.

Thus, with the construction provided, it can be seen that each of the tube bundles 58 is independent from the other tube bundles and are connected by exterior connections through vapor-liquid separating drums in parallel circuits so that at least four vapor generators are provided, each having two parallelly arranged vapor generating tube bundles.

A reactor of this type would be most effectively operated using pressurized water as a body of liquid within the vessel 10 to provide a cooling means. This body of liquid would be maintained in a pressurized condition by some form of pressurizer of a well known type (not shown), at a pressure which is high enough to permit the aforesaid removal of heat and the generation of steam. Typical of such a pressure is 2000 p.s.i.g. and should it be desired to operate the reactor without any net vapor generation of the primary coolant, the liquid would be maintained at an average temperature on the order of 550° F.

The core 24 would be made critical by moving the control rods 28 out of the core, initiating and maintaining a self-sustaining chain reaction producing a number of fissions manifested as heat in the heterogeneous fuel elements. The temperature of the primary coolant fluid rises as it absorbs this heat, increasing the specific volume of the fluid, causing it to flow upwardly through the riser 48. As the heated fluid leaves the core 24, it is replaced by cooler fluid from the downcomer 50. In view of the fact that the downcomer 50 contains a cool dense fluid, a thermosiphonic action is set up which causes a natural circulation of the coolant. A lower pressure vaporizable secondary fluid is contained within the tubes of the bundles 58 which, due to difference in temperature, absorbs heat from the primary fluid generating vapor which may be utilized. As the differential pressure for causing natural circulation of the primary fluid is the difference between the weight of the fluid in the riser 48 and that in the downcomer 50, it can be readily recognized that the circulation rate is dependent upon the height between the center of the core 24 and the center of the tube bundles 58 plus the pressure drop through the tube bundles. Thus, by providing cooling tubes in the annulus at a height above the core, and arranging the tubes in the bundles for the possible lowest pressure drop through the same, good circulation is assured.

The low pressure vaporizable secondary liquid contained in the tube bundles enters the inlet chambers 16 from the external downcomers 14, passes through the tube bundles wherein vapor is generated and passes out through the outlet chambers 18 and up the risers 20 as a steam-water mixture to the drums 12. Each of the steam drums 12 separates the mixture into its components passing the steam out of the outlet 22 and the separated liquid down the downcomers 13 for another passage through the system. Each of the drums 12 is provided with make up feed water from a source, not shown, in proportion to the amount of steam generated according to the well known principles of steam generation. As shown, there are four parallel steam generators, the steam from which may be collected in one conduit or, if desired, may be separately used. One of the features of this arrangement is that certain of the vapor generators may be removed from service because of tube leakage in the associated tube bundles or because of lower vapor requirements without forcing the shutdown of the entire reactor. Each of the pairs of tube bundles may also be maintained and individually isolated thus providing a more flexible and, from an operating viewpoint, superior arrangement.

The support of the steam separating drums by the pressure vessel itself yields a compact unit while eliminating the separate heat exchangers and pumps of the prior art. The very compactness of the present arrangement in itself is a desirable feature for it reduces the amount of biological shielding necessary for a reactor of any given size in comparison to those of the prior art.

Although the invention has been illustrated wherein primary fluid is naturally circulated without any net boiling, it should be obvious to those skilled in the art that the reactor may be advantageously operated with net boiling and/or forced circulation. Moreover, the reactor may be constructed in such a manner that the annular tube bundles may be other than vertical and may be operated as once-through drumless boilers.

It should be equally obvious to those skilled in the art that any reactor coolant may be utilized in such an arrangement.

Although the term "heterogeneous" has been applied to the reactor, it should be understood that any reactor which is capable of producing and maintaining a controlled chain reaction within a confined volume could be utilized in performing the invention. The constructional features of the reactor are independent of the details of the reactor core as these may be provided by any man skilled in the art.

The present invention provides a most compact and reliable power reactor which yields complete accessibility for maintenance of all portions of the reactor. It minimizes vertical and transverse dimensions and thus represents a very substantial improvement in the art.

While in accordance with the provisions of the statutes we have illustrated and described herein a specific form of the invention now known to us, those skilled in the art will understand that changes may be made in the form of the invention disclosed without departing from the spirit of the invention covered by our claims, and that certain features of the invention may sometimes be used to advantage without a corresponding use of the other features.

What is claimed is:

1. A nuclear reactor comprising an upright wall forming a vertically elongated pressure vessel having an opening in the upper end thereof, a removable closure for said opening, an upright tubular baffle arranged in said pressure vessel and removable through said opening, said baffle coacting with said pressure vessel wall to form a downcomer passage therebetween and an upright central riser chamber, said baffle providing communication between said riser chamber and said downcomer passage at the upper and lower ends thereof, means including a plurality of heterogeneous nuclear fuel elements arranged as a core in said riser chamber to provide a controlled self-sustaining fission-type chain reaction, a fluid coolant having a circulation upwardly through said core and said riser chamber and downwardly through said downcomer passage, a tube bundle disposed in said downcomer passage and at least partly offset from the perimeter of said pressure vessel upper end opening, said tube bundle being arranged to permit radial inward movement thereof upon removal of only said baffle through said pressure vessel upper end opening, said tube bundle having a maximum radial dimension less than the diameter of said pressure vessel upper end opening to permit removal of said tube bundle therethrough, and means for passing a secondary heat absorbing fluid through said tube bundle.

2. A nuclear reactor as claimed in claim 1 wherein said removable pressure vessel closure has a cup shape and is arranged to sealingly engage at its upper end with said pressure vessel opening with the lower end of said closure dependent within said pressure vessel.

3. A nuclear reactor as claimed in claim 2 wherein a plurality of control drive mechanisms are supported within said cup-shaped closure and have means sealingly extending through the bottom of said closure to the interior of said pressure vessel to control said fission-type chain reaction.

4. A nuclear reactor comprising an upright wall forming a vertically elongated substantially cylindrical pressure vessel having an opening in the upper end thereof, a removable closure for said opening, an upright substantially cylindrical baffle arranged in said pressure vessel and removable through said opening, said baffle coacting with said pressure vessel wall to form an annular downcomer passage therebetween and an upright central riser chamber, said baffle providing communication between said riser chamber and said downcomer passage at the upper and lower ends thereof, means including a plurality of heterogeneous nuclear fuel elements arranged as a core in said riser chamber to provide a controlled self-sustaining fission-type chain reaction, a fluid coolant having a circulation upwardly through said core and said riser chamber and downwardly through said downcomer passage, a tube bundle having a secondary fluid connection extending through the pressure vessel wall disposed in said annular downcomer passage and at least partly offset from the perimeter of said pressure vessel upper end opening, said tube bundle being arranged to permit radial inward movement thereof upon removal of only said baffle through said pressure vessel upper end opening, said tube bundle having a maximum radial dimension less than the diameter of said pressure vessel upper end opening to permit removal of said tube bundle therethrough, and means for passing a secondary heat absorbing fluid through said tube bundle.

5. A nuclear reactor comprising an upright wall forming a vertically elongated substantially cylindrical pressure vessel having an opening in the upper end thereof, a removable closure for said opening, an upright substantially cylindrical baffle arranged in said pressure vessel and removable through said opening, said baffle coacting with said pressure vessel wall to form an annular downcomer passage therebetween and an upright central riser chamber, said baffle providing communication between said riser chamber and said downcomer passage at the upper and lower ends thereof, means including a plurality of heterogeneous nuclear fuel elements arranged as a core in said riser chamber to provide a controlled self-sustaining fission-type chain reaction, a fluid coolant having a circulation upwardly through said core and said riser chamber and downwardly through said downcomer passage, a plurality of tube bundles each having a secondary fluid connection extending through the pressure vessel wall disposed in said annular downcomer passage and at least partly offset from the perimeter of said pressure vessel upper end opening, each of said tube bundles being arranged to permit radial inward movement thereof upon removal of only said baffle through said pressure vessel upper end opening, said tube bundle having a maximum radial dimension less than the diameter of said pressure vessel upper end opening to permit removal of said tube bundle therethrough, and means for passing a secondary heat absorbing fluid through said tube bundles.

6. A nuclear reactor comprising an upright wall forming a vertically elongated substantially cylindrical pressure vessel having an opening in the upper end thereof, a removable closure for said opening, an upright substantially cylindrical baffle arranged in said pressure vessel and removable through said opening, said baffle coacting with said pressure vessel wall to form an annular downcomer passage therebetween and an upright central riser chamber, said baffle providing communication between said riser chamber and said downcomer passage at the upper and lower ends thereof, means including a plurality of heterogeneous nuclear fuel elements arranged as a core in the lower portion of said riser chamber to provide a controlled self-sustaining fission-type chain reaction, a fluid coolant having a circulation upwardly through said core and said riser chamber and downwardly through said downcomer passage, a plurality of tube bundles each having a secondary fluid connection extending through the pressure vessel wall disposed in said annular downcomer passage above the upper end of said core and at least partly offset from the perimeter of said pressure vessel upper end opening, each of said tube bundles being arranged to permit radial inward movement thereof upon removal of only said baffle through said pressure vessel upper end opening, said tube bundle having a maximum radial dimension less than the diameter of said pressure vessel upper end opening to permit removal of said tube bundle therethrough, and means for passing a secondary heat absorbing fluid through said tube bundles.

7. A nuclear reactor comprising an upright wall forming a vertically elongated substantially cylindrical pressure vessel having an opening in the upper end thereof, a removable closure for said opening, an upright substantially cylindrical baffle arranged in said pressure vessel and removable through said opening, said baffle coacting with said pressure vessel wall to form an annular downcomer passage therebetween and an upright central riser chamber, said baffle providing communication between said riser chamber and said downcomer passage at the upper and lower ends thereof, means including a plurality of heterogeneous nuclear fuel elements arranged as a core in the lower portion of said riser chamber to provide a controlled self-sustaining fission-type chain reaction, a fluid coolant having a natural circulation upwardly through said core and said riser chamber and downwardly through said downcomer passage, a plurality of tube bundles each having a secondary fluid connection removably extending through the pressure vessel wall disposed in said annular downcomer passage above the upper end of said core and at least partly offset from the perimeter of said pressure vessel upper end opening, each of said tube bundles being arranged to permit radial inward movement thereof upon removal of only said baffle through said pressure vessel upper end opening, said tube bundle having a maximum radial dimension less than the diameter of said pressure vessel upper end opening to permit removal of said tube bundle therethrough, and means for passing a secondary heat absorbing fluid through said tube bundles.

8. A nuclear reactor comprising an upright wall forming a vertically elongated substantially cylindrical pressure vessel having an opening in the upper end thereof, a removable closure for said opening, an upright substantially cylindrical baffle arranged in said pressure vessel and removable through said opening, said baffle coacting with said pressure vessel wall to form an annular downcomer passage therebetween and an upright central riser chamber, said baffle providing communcation between said riser chamber and said downcomer passage at the upper and lower ends thereof, means including a plurality of heterogeneous nuclear fuel elements arranged as a core in the lower portion of said riser chamber to provide a controlled self-sustaining fission-type chain reaction, a fluid coolant having a natural circulation upwardly through said core and said riser chamber and downwardly through said downcomer passage, a plurality of tube bundles each having a secondary fluid connection removably extending through the pressure vessel wall disposed in said annular downcomer passage above the upper end of said core and at least partly offset from the perimeter of said pressure vessel upper end opening, each of said tube bundles being arranged to permit radial inward movement thereof upon removal of only said baffle through said pressure vessel upper end opening, said tube bundle having a maximum radial dimension less than the diameter of said pressure vessel upper end opening to permit removal of said tube bundle therethrough and means for passing a secondary heat absorbing fluid through said tube bundles, said fluid connections comprising a tube sheet and a head integrally attached to one face thereof forming a chamber with said head removably extending through the pressure vessel wall.

9. A nuclear reactor comprising an upright wall forming a vertically elongated substantially cylindrical pressure vessel having an opening in the upper end thereof, a removable closure for said opening, an upright substantially cylindrical baffle arranged in said pressure vessel and removable through said opening, said baffle coacting with said pressure vessel to form an annular downcomer passage therebetween and an upright central riser chamber, said baffle providing communication between said riser chamber and said downcomer passage at the upper and lower ends thereof, means including a plurality of heterogeneous nuclear fuel elements arranged as a core in the lower portion of said riser chamber to provide a controlled self-sustaining fission-type chain reaction, a fluid coolant having a natural circulation upwardly through said core and said riser chamber and downwardly through said downcomer passage, a plurality of upright tube bundles disposed in and occupying substantially the entire radial extent of said annular downcomer passage above the upper end of said core and at least partly offset from the perimeter of said pressure vessel upper end opening, each of said tube bundles having at least one end extending in a horizontal direction ending in a secondary fluid connection removably extending though said upright pressure vessel wall, each of said tube bundles being arranged to permit radial inward movement thereof upon removal of only said baffle through said pressure vessel upper end opening, said tube bundle having a maximum radial dimension less than the diameter of said pressure vessel upper end opening to permit removal of said tube bundle therethrough, and means for passing a secondary heat absorbing fluid through said tube bundles.

10. A nuclear reactor comprising an upright wall forming a vertically elongated substantially cylindrical pressure vessel having an opening in the upper end thereof, a removable closure for said opening, an upright substantially cylindrical baffle supported in said opening and coacting with said pressure vessel to form an annular downcomer passage therebetween and an upright central riser chamber, said baffle providing communication between said riser chamber and said downcomer passage at the upper and lower ends thereof, means including a plurality of heterogeneous nuclear fuel elements arranged as a core in the lower portion of said riser chamber to provide a controlled self-sustaining fission-type chain reaction, said baffle having a maximum diameter less than the diameter of said pressure vessel opening and removable therethrough, a fluid coolant having a natural circulation upwardly through said core and said riser chamber and downwardly through said downcomer passage, a plurality of upright tube bundles disposed in and occupying substantially the entire radial extent of said annular downcomer passage above the upper end of said core and at least partly offset from the perimeter of said pressure vessel upper end opening, each of said tube bundles having at least one end extending in a horizontal direction ending in a secondary fluid connection removably extending through said upright pressure vessel wall, each of said tube bundles being arranged to permit radial inward movement thereof upon removal of only said baffle through said pressure vessel upper end opening, said tube bundle having a maximum radial dimension less than the diameter of said pressure vessel upper end opening to permit removal of said tube bundle therethrough, and means for passing a secondary heat absorbing fluid through said tube bundles, said fluid connections comprising a tube sheet and a head integrally attached to one face thereof forming a chamber with said head removably extending through said upright pressure vessel wall.

11. A nuclear reactor comprising an upright wall forming a vertically elongated substantially cylindrical pressure vessel having an opening in the upper end thereof, a removable closure for said opening, an upright substantially cylindrical baffle supported in said opening and coacting with said pressure vessel to form an annular downcomer passage therebetween and an upright central riser chamber, said baffle providing communication between said riser chamber and said downcomer passage at the upper and lower ends thereof, means including a plurality of heterogeneous nuclear fuel elements arranged as a core in the lower portion of said riser chamber to provide a controlled self-sustaining fission-type chain reaction, said baffle having a maximum diameter less than the diameter of said pressure vessel opening and removable therethrough, a fluid coolant having a natural circulation upwardly through said core and said riser chamber and downwardly through said downcomer passage, a plurality of upright C-shaped tube bundles disposed in and occupying substantially the entire radial extent of said annular downcomer passage above the upper end of said core and at least partly offset from the perimeter of said pressure vessel upper end opening, each of said C-shaped tube bundles having horizontally extending ends terminating in a secondary fluid connection which removably extends through said upright pressure vessel wall, each of said C-shaped tube bundles being arranged to permit radial inward movement thereof upon removal of only said baffle through said pressure vessel upper end opening, said tube bundle having a maximum radial dimension less than the diameter of said pressure vessel upper end opening to permit removal of said tube bundle therethrough, and means for passing a secondary heat absorbing fluid through said tube bundles, each of said secondary fluid connections comprising a tube sheet and an integrally attached head enclosing one face of said tube sheet said heads removably extending through said upright pressure vessel wall.

12. A nuclear reactor comprising an upright wall forming a vertically elongated substantially cylindrical pressure vessel having an opening in the upper end thereof, a removable closure for said opening, an upright substantially cylindrical baffle supported in said opening and coacting with said pressure vessel to form an annular downcomer passage therebetween and an upright central riser chamber, said baffle providing communication between said riser chamber and said downcomer passage at the upper and lower ends thereof, means including a plurality of heterogeneous nuclear fuel elements arranged as a core in the lower portion of said riser chamber to provide a controlled self-sustaining fission-type chain reaction, said baffle having a maximum diameter less than the diameter of said pressure vessel opening and removable therethrough, a fluid coolant having a natural circulation upwardly through said core and said riser chamber and downwardly through said downcomer passage, a plurality of openings formed in the upright wall of said pressure vessel, a plurality of C-shaped heat exchange tubes arranged as upright C-shaped tube bundles disposed in and occupying substantially the entire radial extent of said annular downcomer passage above the upper end of said core and at least partly offset from the perimeter of said pressure vessel upper end opening, each of said C-shaped tube bundles having horizontally extending ends terminating in a secondary fluid connection which removably extends through one of said openings in said upright pressure vessel wall, each of said C-shaped tube bundles being arranged to permit radial inward movement thereof upon removal of only said baffle through said pressure vessel upper end opening, said tube bundle having a maximum radial dimension less than the diameter of said pressure vessel upper end opening to permit removal of said tube bundle therethrough, and means for passing a secondary heat absorbing fluid through said tube bundles, each of said fluid connections comprising a tube sheet and an integrally attached head enclosing one face of said tube sheet, said heads removably extending through and said tube sheets removably closing and sealing said openings in said upright pressure vessel wall.

13. A nuclear reactor as claimed in claim 12 wherein a vapor-liquid separating vessel is arranged in series flow relationship with at least one of said tube bundles, said separating vessel being attached to and supported by said pressure vessel.

References Cited by the Examiner
UNITED STATES PATENTS

| | | | |
|---|---|---|---|
| 2,851,409 | 9/1958 | Moore | 176—61 |
| 2,946,732 | 7/1960 | Wootton | 176—53 |
| 3,012,547 | 12/1961 | Ostergaard et al. | 176—53 X |
| 3,095,110 | 5/1963 | Pierce | 220—46 |
| 3,105,805 | 10/1963 | Rodwell | 176—60 |
| 3,140,792 | 8/1964 | Harris | 220—24 |

FOREIGN PATENTS

| | | |
|---|---|---|
| 1,265,483 | 5/1961 | France. |
| 800,385 | 8/1958 | Great Britain. |

OTHER REFERENCES

Nuclear Power, January 1960, pages 108–110.

LEON D. ROSDOL, *Primary Examiner.*

REUBEN EPSTEIN, CARL D. QUARFORTH, *Examiners.*

L. DEWAYNE RUTLEDGE, *Assistant Examiner.*